United States Patent [19]
Gerein et al.

[11] Patent Number: 6,035,943
[45] Date of Patent: Mar. 14, 2000

[54] FRAME LEVELING SYSTEM FOR TILLAGE IMPLEMENTS

[75] Inventors: Mark A. Gerein, Martensville; Ron Zwarich, Saskatoon, both of Canada

[73] Assignee: Flexi-Coil Ltd, Saskatoon, Canada

[21] Appl. No.: 09/089,837

[22] Filed: Jun. 3, 1998

[30] Foreign Application Priority Data

May 28, 1998 [CA] Canada .................................. 2238922

[51] Int. Cl.$^7$ ................................................. A01B 59/00
[52] U.S. Cl. ........................................... 172/328; 172/677
[58] Field of Search .................................... 172/328, 327, 172/318, 400, 413, 448, 449, 396, 417, 274, 677, 678, 679; 280/414.5, 438.1, 481

[56] References Cited

U.S. PATENT DOCUMENTS

| | | | |
|---|---|---|---|
| 3,912,017 | 10/1975 | Rehn ....................................... | 172/328 |
| 3,912,018 | 10/1975 | Brundage et al. ...................... | 172/328 |
| 4,308,920 | 1/1982 | Floyd et al. ............................ | 172/328 |
| 4,373,591 | 2/1983 | Schaaf et al. .......................... | 172/328 |
| 4,379,491 | 4/1983 | Riewerts et al. ....................... | 172/328 |
| 4,450,917 | 5/1984 | Hake ...................................... | 172/328 |
| 5,152,347 | 10/1992 | Miller .................................. | 172/328 X |
| 5,348,101 | 9/1994 | Fox et al. ............................. | 172/328 X |
| 5,363,924 | 11/1994 | Foley et al. ............................. | 172/326 |
| 5,687,798 | 11/1997 | Henry et al. ........................... | 172/311 |
| 5,855,245 | 1/1999 | Gerein .................................... | 172/328 |

Primary Examiner—Victor Batson
Attorney, Agent, or Firm—Griffin, Butler, Whisenhunt & Szipl, LLP

[57] ABSTRACT

An agricultural implement provides improvements in ground-working implements having both a lowered ground-working mode and a raised transport mode wherein structure is provided to offset the effects of the moment forces created in the working mode. A fluid circuit is connected to a fluid actuator for controlling forces exerted thereby between a hitch member and the implement main frame and it is operable in a working mode to exert a resilient biasing force on the hitch member thus enabling pivotal floating motion of the hitch member while simultaneously countering force moments applied to the main frame by the ground-working tool. This system is also operable in a transport mode wherein the actuator exerts sufficient force between the hitch member and the forward end of the main frame as to assist in lifting and maintaining the implement in a raised transport mode.

15 Claims, 9 Drawing Sheets

Figure 7

# FRAME LEVELING SYSTEM FOR TILLAGE IMPLEMENTS

BACKGROUND OF THE INVENTION

This invention relates to improvements in agricultural ground-working implements having both a lowered ground-working mode and a raised transport mode.

It is well known that an agricultural ground-working implement has better ground following characteristics when the hitch of the implement is pivotally attached to the implement frame. An implement with a pivoting hitch, typically referred to as a floating hitch, follows the contour of the ground independently of the elevation of the forward end of the hitch which is attached to the drawbar of the pulling vehicle, i.e. a tractor. The implement frame is typically equipped with gauge wheels located near the front of the frame to set and control the penetration depth of the ground-working tools. The tractive force produced by the tractor acts through the implement hitch to pull the implement tools through the soil. The draft forces are substantial since ground-working tools have a substantial resistance to being pulled through the soil. This draft force is offset from the reaction forces at the ground tools and this creates a moment force on the implement. An implement with a free floating hitch is not restrained from rotation due to this draft moment force. Hence, this moment force causes the implement to rotate in a manner such that the rear of the implement moves upwardly relative to the front of the implement with the result being that the rearwardly disposed ground-engaging tools are raised above the set and desired working depth.

The prior art has provided various forms of systems which act between the implement hitch and the implement frame to counter the draft moment force referred to above in an effort to maintain the implement generally parallel to the ground. The earlier systems were in the form of spring loaded devices while more recent systems have employed hydraulic systems which are designed to act between the implement hitch and the implement frame in such a way as to at least partially counter the draft moment force referred to above.

SUMMARY OF THE INVENTION

It is a general objective of the invention to provide improvements in ground-working implements having both a lowered ground-working mode and a raised transport mode and wherein means are provided to offset the effects of the moment forces noted above in the working mode.

A primary feature of the invention provides improvements in implements of the type noted above by employing a fluid circuit means connected to a fluid actuator for controlling forces exerted thereby between a hitch member and an implement main frame and operable in a working mode to exert a resilient biasing force on the hitch member thus enabling pivotal floating motion of the hitch member while simultaneously countering force moments applied to the main frame by the ground-working tools. This system is also operable in a transport mode wherein the actuator exerts sufficient force between the hitch member and the forward end of the main frame as to assist in lifting and maintaining the implement in a raised transport mode.

Accordingly the invention in one aspect provides an improved agricultural ground-working implement having both a lowered ground-working mode and a raised transport mode. This implement includes a main frame having ground-working tools thereon with positioning wheels on said main frame having means associated therewith for moving the positioning wheels between ground working and transport positions. An elongated towing hitch member has its rear end attached to a frontal end of said main frame for pivotal movement about a generally horizontal axis transverse to the forward travel direction of said main frame, and a forward end connectable to a tractor drawbar. A fluid actuator is connected between the frontal end of said main frame and said hitch member at pivot points spaced from said horizontal axis for exerting components of force on said hitch member which tend to effect pivotal motion of said hitch member relative to said main frame. A fluid circuit means connectable to a source of fluid pressure is provided and is connected to said fluid actuator for controlling the forces exerted thereby between said hitch member and said main frame. This fluid circuit is selectively operable in:

(a) the working mode such that said actuator exerts a selected resilient biasing force on said hitch member enabling a pivotal floating motion of the hitch member relative to said main frame while simultaneously countering force moments applied to said main frame by said tools and transferring downward force components to said hitch member and thence to the tractor drawbar; and (b) the transport mode wherein said actuator exerts sufficient force between said hitch member and the forward end of the main frame as to assist in lifting and maintaining said implement in the raised transport mode.

In one form of the invention said fluid circuit means are also operatively connected to said means for moving the positioning wheels such that on selection of the transport mode, said transport wheels are moved to the transport positions where they assist in maintaining said implement in the raised transport mode.

In a preferred form of the invention said means for moving the positioning wheels have a depth stop means associated therewith to help establish the height of said implement above ground in the working mode.

In a typical embodiment of the invention said positioning wheels are located toward rear end portions of said frame, and gauge wheels are positioned adjacent forward end portions of said frame and co-operate with said positioning wheels to establish a selected implement height above ground in the working mode.

The above-noted fluid circuit means preferably includes an adjustable pressure control valve to enable the biasing force exerted by said actuator on said hitch member to be varied as required to offset the force moments encountered in the working mode thereby to assist in keeping the implement in a position generally parallel to the ground in the working mode.

In accordance with another preferred feature of the invention said fluid circuit means includes means to disable said pressure control valve when in the raised transport mode such that said actuator is subject to the full pressure available at said source (e.g. the tractor hydraulic system) whereby said actuator tends to behave as a rigid link between said main frame and said hitch member in the raised transport mode.

It is to be noted that the term "transport mode" used herein includes transport not only along a roadway but also the movement which takes place at the headlands of a field, i.e. when the implement is raised and turned at the end of a field after completion of a lengthwise ground working pass.

Further aspects of the invention will become apparent from the following description of preferred embodiments of same with reference being had to the accompanying drawings.

DETAILED DESCRIPTION OF PREFERRED EMBODIMENTS

Figure 1:
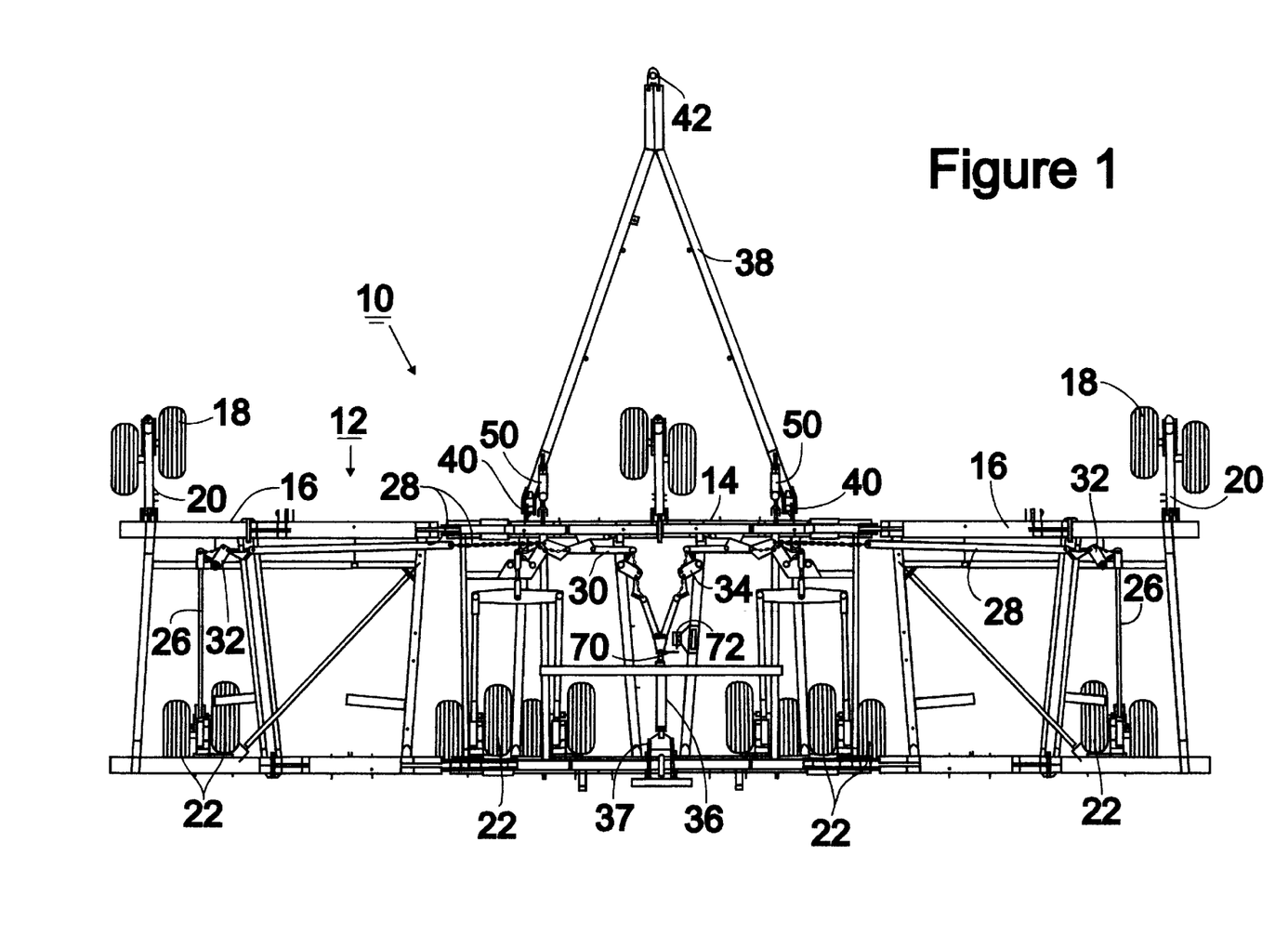
FIG. 1 is a top plan view of an agricultural ground-working implement in accordance with an embodiment of the present invention.
Figure 2:
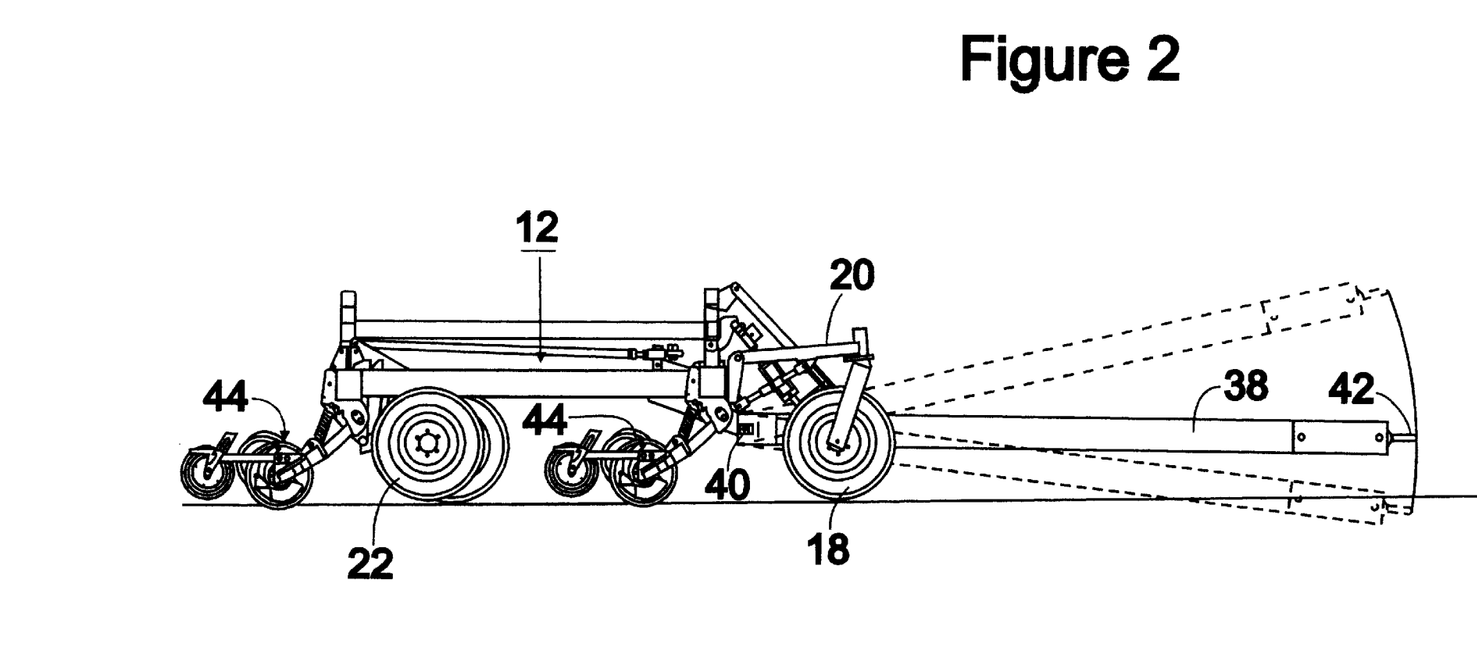
FIG. 2 is a side elevation view of the ground-working implement in the lowered ground-working mode.
Figure 3:
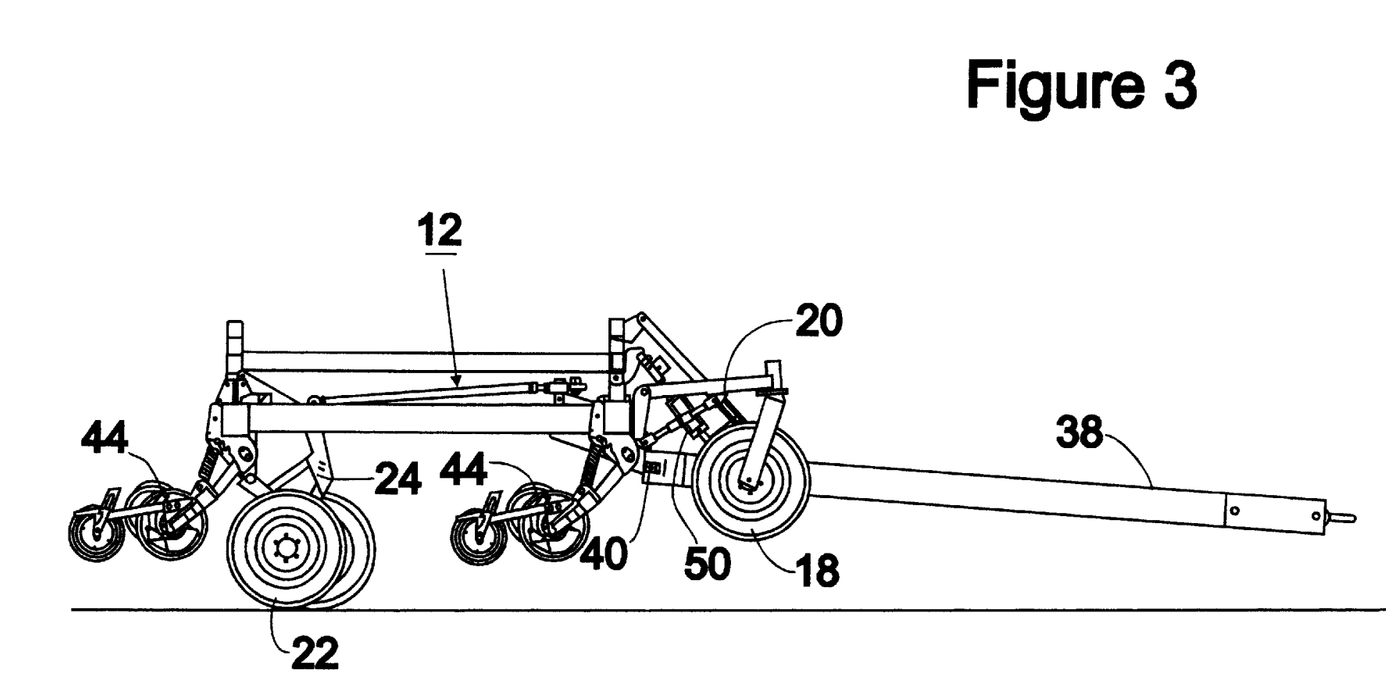
FIG. 3 is a side elevation view of the ground-working implement in the raised transport mode.

Referring firstly to FIGS. 1, 2 and 3, there is shown an agricultural ground-working implement 10 having both a lowered ground-working mode and a raised transport mode. This implement includes a main frame 12 which, as best seen in FIG. 1, is of generally rectangular outline having a center section 14 flanked by a pair of wing sections 16 pivotally connected to the center section 14 by hinges in a manner well known in the art.

The frontal end portion of the main frame 12 carries a plurality of pairs of gauge wheels 18, each pair of gauge wheels being secured to the main frame by a gauge wheel support 20 which is manually adjustable in known manner thereby to set the desired working depth. A plurality of positioning wheels 22 are mounted to the rear or trailing end of the main frame 12 in a manner well known in the art by way of respective pivoting supports 24 which are movable between the working position shown in FIG. 2 to the transport position illustrated in FIG. 3. These pivoting supports 24 are activated by means of a series of lift linkages 26, 28, 30, including bell crank arms 32, 34, all of which linkages are ultimately connected to the rod end of a positioning cylinder 36 located at the mid point of the frame with the closed end of the positioning cylinder 36 connected by a bracket 37 to the rear end of the frame center section 14. A detailed description of the positioning wheels 22, their pivoting supports 24 and the lift linkages and the manner in which the linkages interact with each other and interconnect with the positioning cylinder 36 need not be described in further detail as these features are well known in this art.

An elongated towing hitch 38 is attached to the front end of the center section 14 of the main frame by way of pivot shafts 40 thereby permitting pivotal movement of the towing hitch 38 about a generally horizontal axis transverse to the forward travel direction of the main frame. The forward end 42 of the towing hitch is connectable to a tractor drawbar (not shown) in well known fashion.

With reference to FIGS. 2 and 3, it will be seen that a plurality of ground-working tools 44, e.g. disk harrows, are secured to the main frame 12, again in a manner well known in the art. In the lowered ground-working mode illustrated in FIG. 2, these tools 44 penetrate into the earth a desired distance and, as is well known in the art, the reaction forces on these tools and the draft force exerted by the tractor through the towing hitch 38 exerts a couple or moment force on the main frame 12 which tends to lift the rear of the implement upwardly while forcing the frontal end downwardly during operation.

Figure 4:
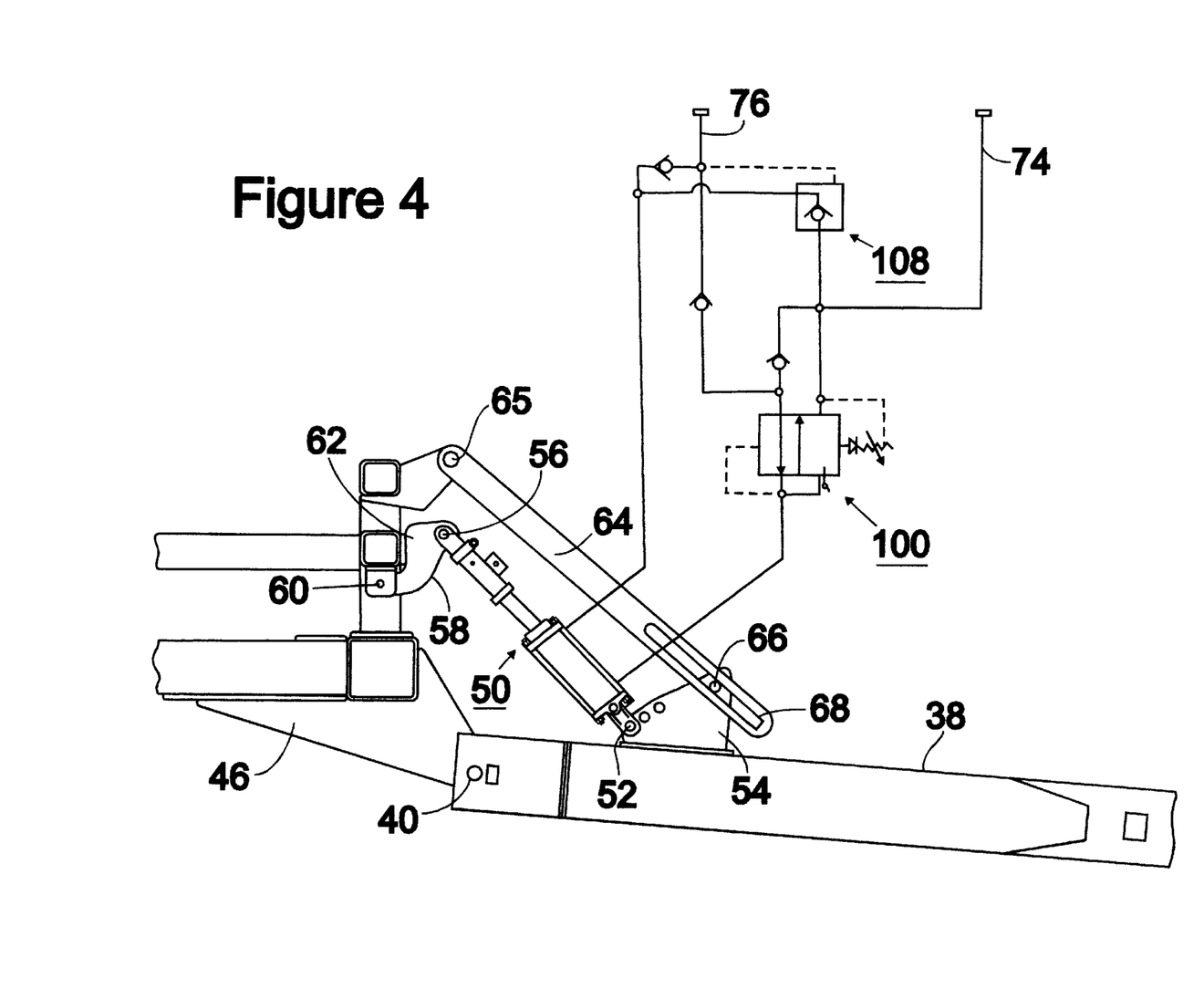
FIG. 4 is a side elevation of a frontal portion of the main frame and a rear portion of the towing hitch with the hydraulic actuator connected therebetween and also illustrating in schematic form a portion of the hydraulic circuit for supplying the hydraulic actuator.

Referring to FIGS. 1 to 4, the towing hitch 38 is shown attached by pivot shafts 40 to the frontal end of main frame 12 via brackets 46. A pair of double acting hydraulic actuators (hereafter referred to as hitch cylinders 50) have their closed ends secured at pivots 52 to brackets 54 fixed to the proximal ends of towing hitch 38, and their rod ends connected at pivots 56 to "floating" links 58 which in turn are pivotally connected to frame 12 at pivots 60. Each link 58 has a shoulder 62 which abuts frame 12 as shown in FIG. 4 whereby thrust forces generated by the hitch cylinders 50 are exerted between frame 12 and towing hitch 38 thereby generating a force moment about towing hitch pivot shafts 40. The primary function of links 58 will be described hereafter.

A restraint link 64 is attached by pivot 65 to frame 12 and by pin 66 on hitch bracket 54, which pin 66 slides in elongated link slot 68 thereby to limit the maximum arc of swing of towing hitch 38 relative to frame 12.

Referring to FIG. 1, the ram of positioning cylinder 36 has a limit arm 70 attached thereto which is arranged to come into contact with the actuator of a depth stop valve 72 (mounted to the machine frame 12) when the positioning wheels have been moved to the desired working height. Suitable adjustment means (not shown) are provided so that the working height may be varied to suit conditions.

Figure 5:
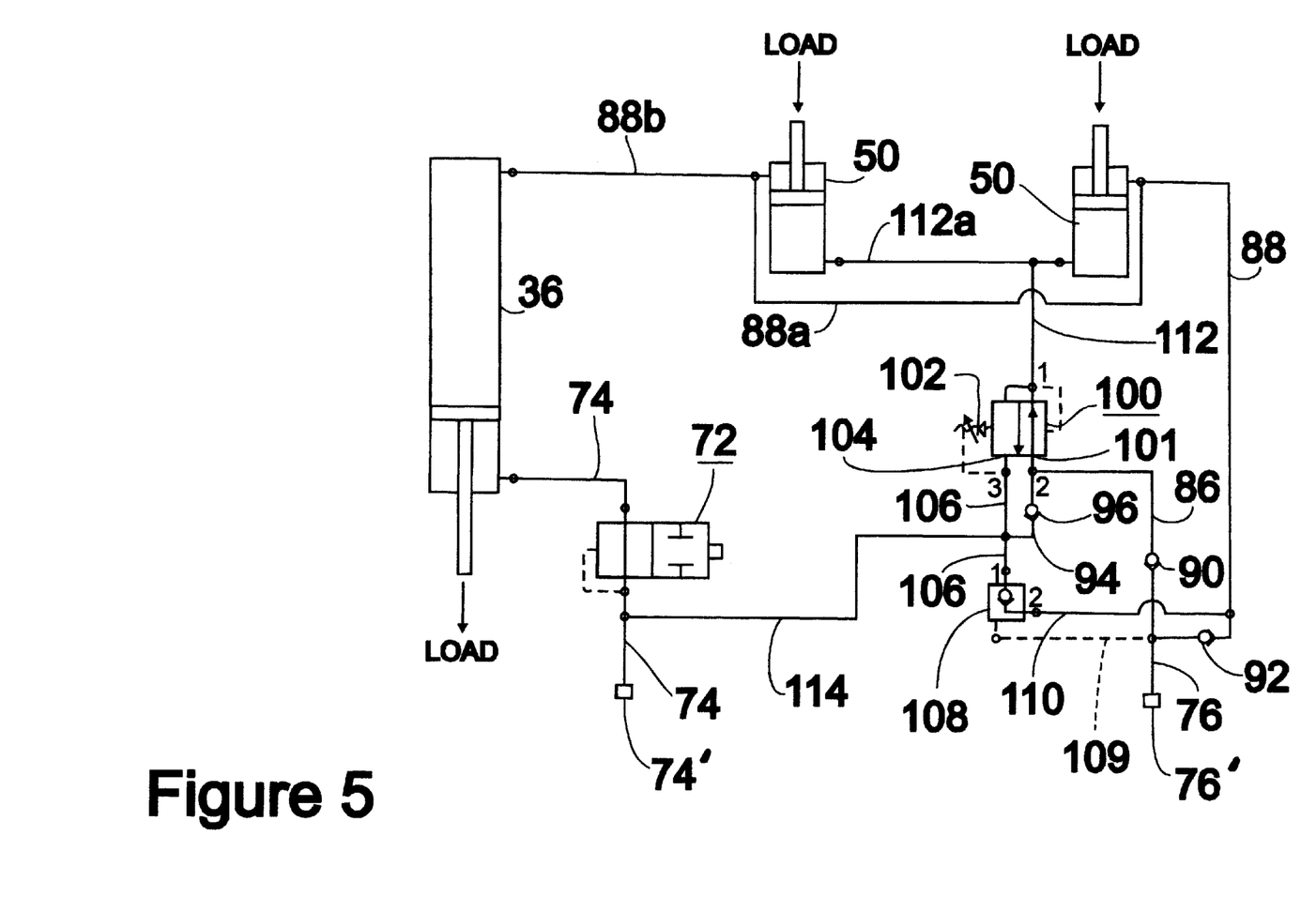
FIG. 5 is a schematic illustration of one form of hydraulic circuit means for controlling the several hydraulic actuators employed.
Figure 5A:
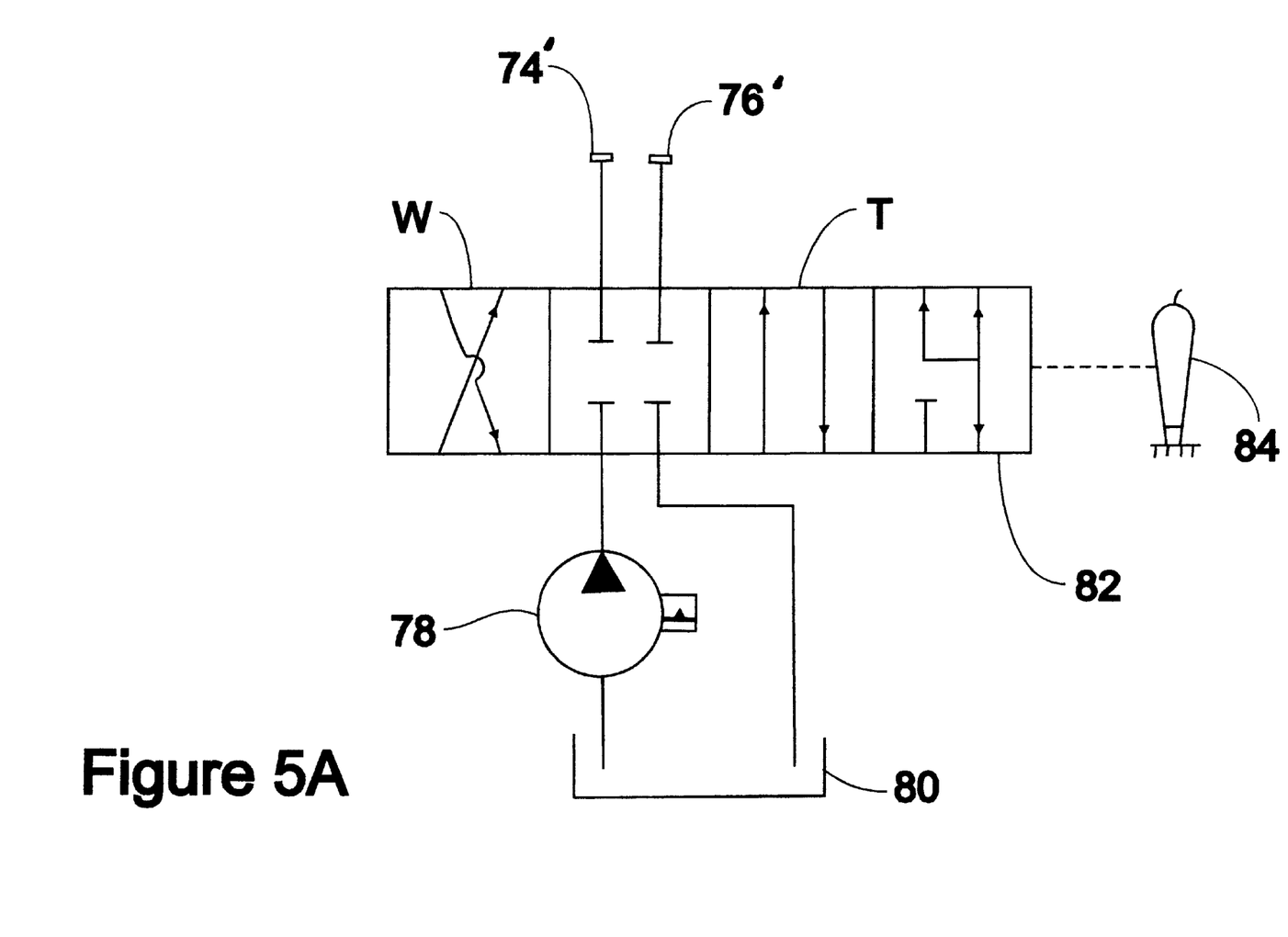
FIG. 5A is a schematic diagram of a typical manually operated four-position control valve together with hydraulic pump and reservoir.

One form of hydraulic control circuit is shown in FIG. 5. This circuit has a pair of main lines 74, 76 which in use are attached via suitable couplings 74+, 76' to the tractor hydraulic system (FIG. 5A). The tractor system employs a pump 78 and a return reservoir 80 coupled to a 4-way, 4 position selective control valve 82 operated by control lever 84. Control valve 82 is shown in the neutral position in FIG. 5A. When control valve 82 is shifted to the transport position T, high pressure fluid from pump 78 is supplied to line 74 via coupling 74' (and line 76 is connected to reservoir 80 through coupling 76') and when valve 82 is shifted to the working position W, line 76 is pressurized from pump 78 and line 74 is connected to reservoir 80.

With further reference to FIG. 5, main line 76 branches into two lines 86 and 88 having respective one-way check valves 90, 92 therein. Branch line 88 is connected via related lines 88a and 88b to the rod ends of the two hitch cylinders 50 and to the closed or base end of the positioning cylinder 36. Line 86 is connected to line 94 having check valve 96 therein, line 96 being connected to one port 101 of a pressure reducing/relieving valve (PRRV) 100 having an adjustable spring 102 enabling the relief pressure to be adjusted as desired (e.g. a Vickers model PRV12-12). The second port 104 of PRRV 100 is connected to line 106 which leads into a special check valve 108 with a line 110 leading from the other side of check valve 108 to a connection with line 88.

A pilot line 109 leads from main line 76 over to check valve 108, the latter being arranged such that it is held open under the influence of fluid pressure in main line 76. The third port of PRRV 100 is connected to line 112 which is connected to the closed ends of the hitch cylinders 50 through line 112*a*.

A further line 114 extends between line 106 and the other main line 74 with main line 74 being connected to the rod end of positioning cylinder 36 via the depth stop valve 72, which, as noted before, blocks flow through line 74 when the desired working height has been reached.

Figure 8:
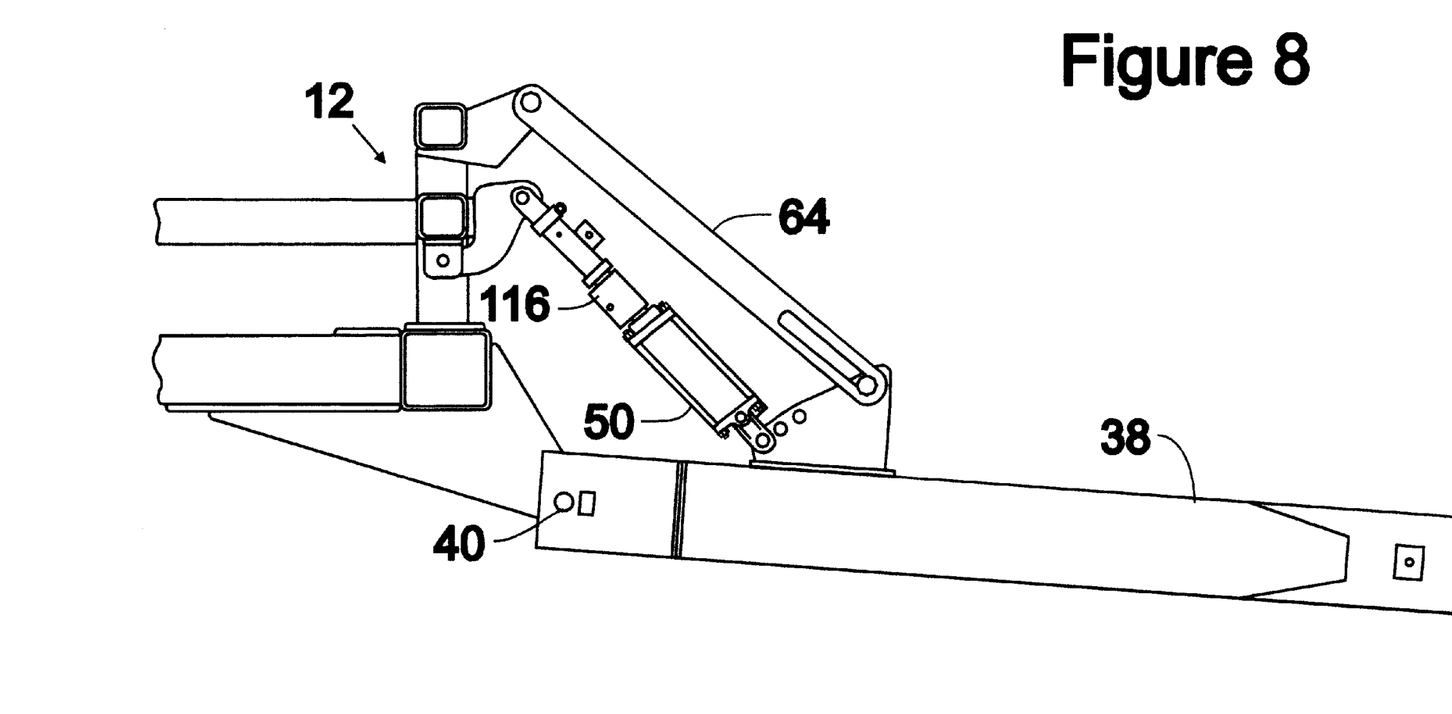
FIG. 8 is a side elevation view similar to FIG. 7 showing the hydraulic actuator (hitch cylinder) extended as in the raised transport mode with the cylinder being locked in the extended position.

To raise the implement to the transport position, selector valve 82 is set at the T position so that full pump pressure is applied to main line 74 which applies fluid pressure to the rod end of positioning cylinder 36 through the stop valve 72 to extend the positioning wheels 22 to raise the implement upwardly. At the same time, the full pump pressure is applied to the closed ends of hitch cylinders 50 via lines 114, 94, PRRV 100 and lines 112, 112*a*, PRRV 100 being held open by the action of the pilot from line 106. Hence the hitch cylinders 50 extend fully to raise the forward end of the implement frame 12 upwardly into the transport position illustrated in FIG. 8, in which position the hitch cylinders effectively act as rigid incompressible links. (For added safety, as shown in FIG. 8, a transport lock 116 is installed on the ram of each hitch cylinder to prevent accidental release in the event of hydraulic system failure).

To change to the working mode, selector valve 82 is set at the W position such that line 76 receives full pump pressure while line 74 is connected to the reservoir 80. The rod end of positioning cylinder 36 drains to the reservoir with the implement lowering downwardly under its own weight until the depth stop valve 72 is activated to block the flow from cylinder 36 at the desired depth setting. At the same time, pressure in line 76 is applied to the closed ends of the hitch cylinders 50 via PRRV 100. The special check valve 108 however is held open by the action of fluid pressure through the pilot line 109. Fluid can flow freely into and out of the opposing ends of the hitch cylinders 50. The relieving side of the PRRV 100 communicates with the reservoir via line 114 and the valve acts to limit the maximum pressure applied to the closed ends of these cylinders in the usual manner. The hitch cylinders 50 thus act as compressible links in the working mode with the degree of biasing force created being selected by the adjusting of relief spring 102 on the PRRV 100. This mode of operation is illustrated in FIG. 4 wherein the relative positions of the main frame 12 and towing hitch 38 during a ground-working operation are illustrated. The biasing forces exerted by hitch cylinders 50 are sufficient to counteract the moment forces applied to the main frame by the combination of the draft forces and the ground tool reaction forces thus keeping the implement fairly parallel to the ground while allowing a measure of "floating action" to take place, thus enhancing the ability of the equipment to follow the contour of the ground in the working mode while at the same time effecting a measure of weight transfer to the tractor drawbar via the towing hitch 38 to increase the tractive forces available. (It has been found that pilot line 109 can be removed and the special check valve 108 replaced with a simple check valve. This valve releases fluid from the rod ends of the hitch cylinders 50 (and from the base end of cylinder 36) when the motion is in one direction, but in the other direction a vacuum is created in the rod ends of the hitch cylinders but this does not appear to adversely affect their ability to move and function as compressible links.)

Figure 6:
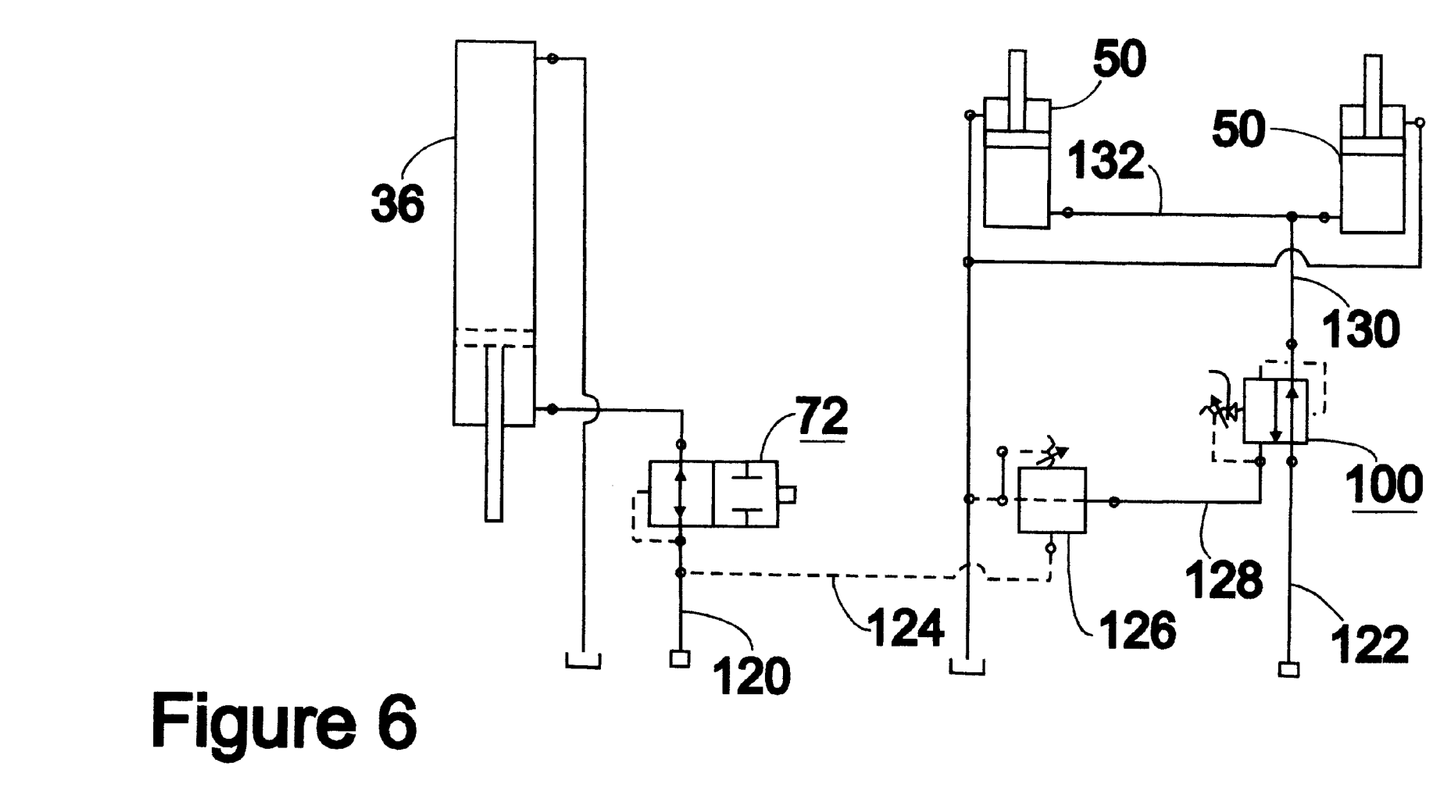
FIG. 6 is a schematic diagram of an alternative form of hydraulic circuit means for controlling the several hydraulic actuators.

A modified form of hydraulic control system is shown in FIG. 6. However, two separate tractor control valves are used (not shown), one for the positioning cylinder 36 and the other valve for the hitch cylinders 50.

To move into the transport mode, full tractor pump pressure is applied to lines 120 and 122. Line 120 feeds the rod end of positioning cylinder 36 as before through depth stop valve 72 to retract cylinder 36 and lift the implement upwardly. Pressure via pilot line 124 is applied to pilot operated shut-off valve 126 which blocks flow from the relief port of the pressure reducing/relieving valve (PRRV) 100 through line 128. Valve 100 is held open in this condition and full tractor hydraulic pressure is applied via lines 122, 130, 132 to the closed ends of the hitch cylinders 50 with the result that they extend fully and act as rigid links as described before with reference to FIGS. 5 and 8 thereby to establish the transport mode for the implement.

To move to the working mode, pressure at line 120 is released and the rod end of cylinder 36 drains through depth stop valve 72 until the desired implement working height is reached, at which point the valve 72 stops further flow. At the same time, since pilot controlled valve 126 is open (there being no pressure in pilot line 124), the PRRV 100 can act to relieve the pressure of fluid being supplied to the closed ends of hitch cylinders 50 through its relief port and line 128 with the result being that they act as compressible links in the working mode as described previously.

It had been noticed that when the depth stop valve 72 is actuated, a brief pressure spike may cause valve 126 to close and remain closed. This causes the hitch cylinders 50 to extend, which is not desired during the working mode. The circuit is found to work well however provided that the operator sets the tractor control connected to the positioning cylinder line 120 to the "float" position after lowering from the transport position. This relieves pressure that builds in line 120 when the depth stop valve 72 is actuated and the tractor control automatically shifts to neutral position in which case the lines are blocked.

Figure 7:
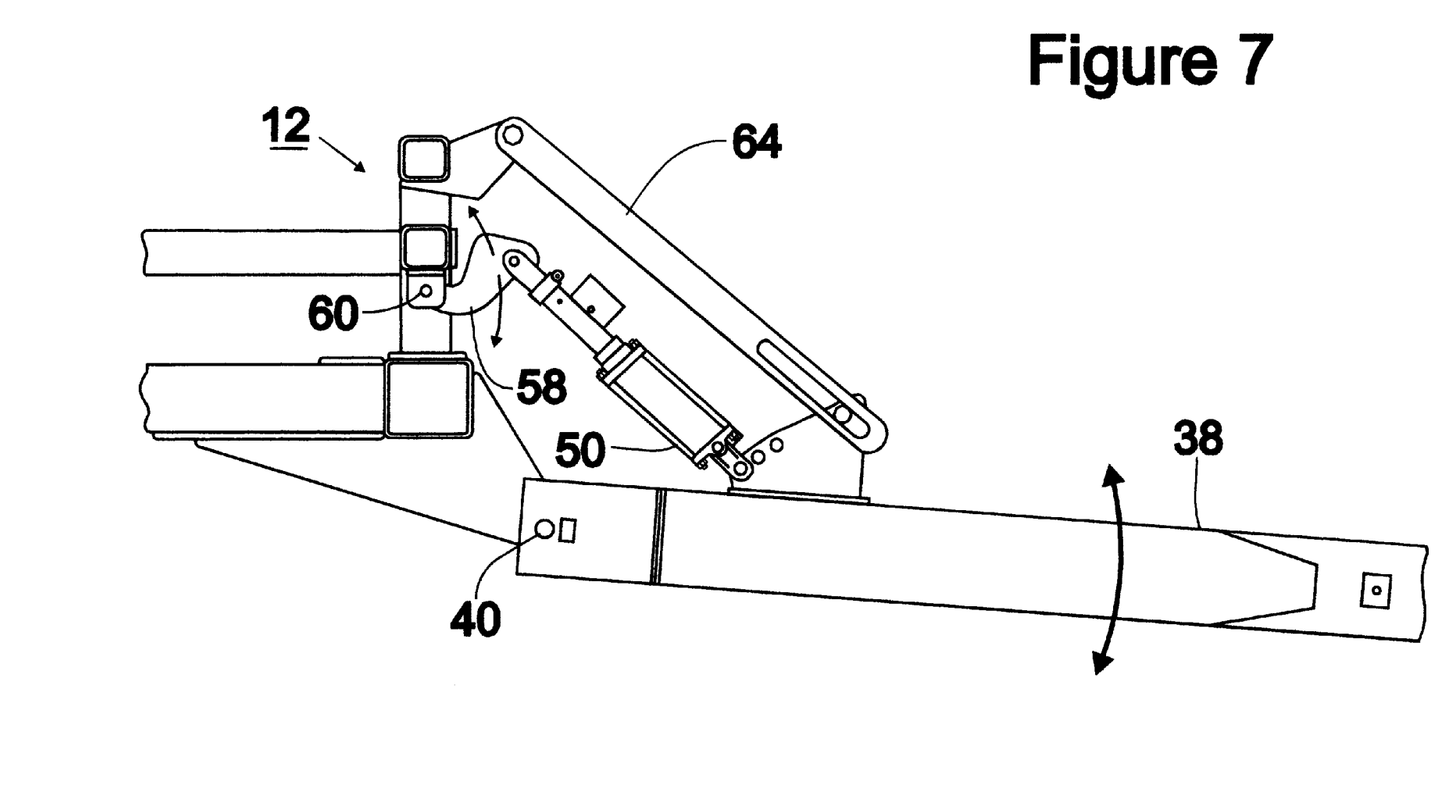
FIG. 7 is a partial side elevation view somewhat similar to FIG. 4 showing the towing hitch in a free floating mode.

One last mode of operation will be described with reference to FIG. 7. This is the "free floating" mode and in this case the hitch cylinders 50 are fully retracted and as the hitch "floats" freely, the pivotal action effects pivoting of the floating link 58 as indicated by the arrows. The restraining link 64 limits the amount of pivotal motion of towing hitch 38.

Preferred embodiments of the invention have been described and illustrated by way of example. Those skilled in the art will realize that various modifications and changes may be made while still remaining within the spirit and scope of the invention. Hence the invention is not to be limited to the embodiments as described but, rather, the invention encompasses the full range of equivalencies as defined by the appended claims.

We claim:

1. An agricultural ground-working implement having both a lowered working mode and a raised transport mode, said implement including:
   (A) a main frame having ground-working tools thereon;
   (B) positioning wheels on said main frame having means associated therewith for moving the positioning wheels between working and transport positions;
   (C) an elongated towing hitch member having a rear end attached to a frontal end of said main frame for pivotal movement about a generally horizontal axis transverse to the forward travel direction of said main frame, and a forward end connectable to a tractor drawbar;
   (D) a fluid actuator connected between the frontal end of said main frame and said hitch member at pivot points spaced from said horizontal axis for exerting components of force on said hitch member which tend to effect pivotal motion of said hitch member relative to said main frame;

(E) fluid circuit means connectable to a source of fluid pressure and connected to said fluid actuator for controlling the forces exerted thereby between said hitch member and said main frame and selectively operable in:

(a) the working mode such that said actuator exerts a selected resilient biasing force on said hitch member enabling a pivotal floating motion of the hitch member relative to said main frame while simultaneously countering force moments applied to said main frame by said tools and transferring downward force components to said hitch member and thence to the tractor drawbar; and (b) the transport mode wherein said actuator exerts sufficient force between said hitch member and the forward end of the main frame as to assist in lifting and maintaining said implement in the raised transport mode; and (F) depth stop means associated with said means for moving said positioning wheels to help establish a working height of said implement above ground in the working mode.

2. The agricultural implement according to claim 1 wherein said fluid circuit means are also operatively connected to said means for moving the positioning wheels such that on selection of the transport mode, said positioning wheels are moved to the transport positions where they assist in maintaining said implement in the raised transport mode.

3. The agricultural implement according to claim 2 wherein said positioning wheels are located toward rear end portions of said frame, gauge wheels being positioned adjacent forward end portions of said frame and cooperating with said positioning wheels to establish a selected implement height above ground in the working mode.

4. The agricultural implement according to claim 3 wherein said fluid circuit means includes an adjustable pressure control valve to enable the biasing force exerted by said actuator on said hitch member to be varied as required to offset the force moments encountered in the working mode thereby to assist in keeping the implement in a position generally parallel to the ground in the working mode.

5. The agricultural implement according to claim 4 wherein said fluid circuit means includes means to disable said pressure control valve when in the raised transport mode such that said actuator is subject to all of said fluid pressure available at said source whereby said actuator tends to behave as a rigid link between said main frame and said hitch member in the raised transport mode.

6. A tillage implement having both a lowered working mode and a raised transport mode, comprising:

a main frame having ground-working tools thereon;

positioning wheels on said main frame having a mechanism associated therewith for moving the positioning wheels between working and transport positions;

an elongated towing hitch member having a rear end attached to a frontal end of said main frame for pivotal movement about a generally horizontal axis transverse to the forward travel direction of said main frame, and a forward end connectable to a tractor drawbar;

a fluid actuator connected between the frontal end of said main frame and said hitch member at pivot points spaced from said horizontal axis for exerting components of force on said hitch member which tend to effect pivotal motion of said hitch member relative to said main frame;

fluid circuit connectable to a source of fluid pressure and connected to said fluid actuator for controlling the forces exerted thereby between said hitch member and said main frame, said fluid circuit including a pressure control valve;

said fluid actuator exerting a resilient biasing force on said hitch member when in said working mode enabling a pivotal floating motion of the hitch member relative to said main frame while simultaneously countering force moments applied to said main frame by said tools and transferring downward force components to said hitch member and thence to the tractor drawbar;

said actuator exerting sufficient force between said hitch member and the forward end of the main frame when in said transport mode so as to assist in lifting and maintaining said implement in the raised transport mode; and said fluid circuit including means for disabling said pressure control valve when in the raised transport mode such that said actuator is subject to all of said fluid pressure available at said source causing said actuator to behave as a rigid link between said main frame and said hitch member in the raised transport mode.

7. The tillage implement of claim 6 wherein said means for disabling said pressure control valve includes a pilot operated shut-off valve that is operable to prevent said pressure control valve from directing fluid to reservoir.

8. The tillage implement of claim 7 wherein said pilot operated shut-off valve receives pilot pressure from said means for moving said positioning wheels.

9. The tillage implement of claim 8 wherein said pressure control valve is adjustable to vary the biasing force exerted by said actuator on said hitch member, whereby the extent of said resilient biasing force to selectively adjustable.

10. The tillage implement of claim 6 wherein said pressure control valve is pilot operated, said means for disabling said pressure control valve includes a hydraulic line that exerts pressure on the pilot to prevent said pressure control valve from shifting to a relief position when said fluid circuit means is shifted into said transport mode.

11. An agricultural tillage implement having both a lowered working mode and a raised transport mode, comprising:

(a) a main frame having ground-working tools thereon;

(b) positioning wheels on said main frame having mechanism associated therewith for moving the positioning wheels between working and transport positions;

(c) an elongated towing hitch member having a rear end attached to a frontal end of said main frame for pivotal movement about a generally horizontal axis transverse to the forward travel direction of said main frame, and a forward end connectable to a tractor drawbar;

(d) a fluid actuator connected between the frontal end of said main frame and said hitch member at pivot points spaced from said horizontal axis for exerting components of force on said hitch member which tend to effect pivotal motion of said hitch member relative to said main frame;

(e) fluid circuit connectable to a source of fluid pressure and connected to said fluid actuator for controlling the forces exerted thereby between said hitch member and said main frame, said fluid circuit regulating pressure at one end of said actuator;

(f) said actuator exerting a resilient biasing force on said hitch member when in said working mode to enable a pivotal floating motion of the hitch member relative to said main frame while simultaneously countering force moments applied to said main frame by said tools and transferring downward force components to said hitch member and thence to the tractor drawbar; and (g) said actuator exerting sufficient force between said hitch member and the forward end of the main frame when in said transport mode so as to assist in lifting and maintaining said implement in the raised transport mode, said fluid circuit including a device for preventing said actuator from being pressure regulated when in said transport mode such that said actuator is subject to all of the fluid pressure available at said source causing said actuator to behave as a rigid link between said main frame and said hitch member in the raised transport mode.

12. The tillage implement of claim 11 wherein said fluid circuit includes a pressure control valve regulating the pressure at said one end of said actuator.

13. The tillage implement of claim 12 wherein said pressure control valve is adjustable to vary the value of the regulated pressure and, thereby, vary the biasing force exerted by said actuator on said hitch member, whereby the extent of said resilient biasing force to selectively adjustable.

14. The tillage implement of claim 13 wherein said pressure control valve is pilot operated, said mechanism for preventing said actuator from being pressure regulated including a hydraulic line that exerts pressure on the pilot to prevent said pressure control valve from shifting to a relief position when said fluid circuit is shifted into said transport mode.

15. The tillage implement of claim 14 wherein said device for preventing said actuator from being pressure regulated includes a pilot operated shut-off valve that is operable to prevent said pressure control valve from directing fluid to reservoir, said pilot operated shut-off valve receiving pilot pressure from said mechanism for moving said positioning wheels.

* * * * *